(12) United States Patent
Li et al.

(10) Patent No.: US 11,193,550 B2
(45) Date of Patent: Dec. 7, 2021

(54) METHOD FOR OPTIMIZING FEATURE PARAMETERS OF STRAIGHT GROOVES OF WET FRICTION ELEMENT

(71) Applicant: Beijing University of Civil Engineering and Architecture, Beijing (CN)

(72) Inventors: Jie Li, Beijing (CN); Xiaoyan Wang, Beijing (CN); Yanxiong Zhang, Beijing (CN); Jialing Gu, Beijing (CN); Long Tao, Beijing (CN); Cheng Chen, Beijing (CN)

(73) Assignee: Beijing University of Civil Engineering and Architecture, Beijing (CN)

( * ) Notice: Subject to any disclaimer, the term of this patent is extended or adjusted under 35 U.S.C. 154(b) by 0 days.

(21) Appl. No.: 17/066,155

(22) Filed: Oct. 8, 2020

(65) Prior Publication Data
US 2021/0123492 A1    Apr. 29, 2021

(30) Foreign Application Priority Data
Oct. 9, 2019    (CN) .......................... 201910953556.5

(51) Int. Cl.
*F16D 69/00*    (2006.01)
*F16D 13/64*    (2006.01)
(52) U.S. Cl.
CPC ........... *F16D 69/00* (2013.01); *F16D 13/648* (2013.01); *F16D 2069/004* (2013.01)
(58) Field of Classification Search
CPC .... F16D 2069/004; F16D 13/72; F16D 13/74; F16D 13/648; F16D 69/00
See application file for complete search history.

(56) References Cited

U.S. PATENT DOCUMENTS

2005/0224310 A1 * 10/2005 Li ........................ F16D 13/74
192/113.36
2005/0284721 A1 * 12/2005 Arcot ................... F16D 13/648
192/70.12

* cited by examiner

*Primary Examiner* — David R Morris
*Assistant Examiner* — Lillian T Nguyen
(74) *Attorney, Agent, or Firm* — Yong Chen

(57) ABSTRACT

Disclosed is a method for optimizing feature parameters of straight grooves of a wet friction element and relates to the technical field of heavy-duty vehicle transmission. By using the method, the feature parameters of the straight grooves of the wet friction element can be improved by optimization, and the thermoelastic stability of the wet friction element can be improved.

4 Claims, 4 Drawing Sheets

METHOD FOR OPTIMIZING FEATURE PARAMETERS OF STRAIGHT GROOVES OF WET FRICTION ELEMENT

CROSS-REFERENCE TO RELATED APPLICATION

The application claims priority to Chinese Application No. 201910953556.5, filed Oct. 9, 2019, the disclosure of which is incorporated herein by reference in its entirety.

FIELD

The present disclosure relates to the technical field of heavy-duty vehicle transmission and specifically relates to a method for optimizing feature parameters of straight grooves of a wet friction element.

BACKGROUND

A high-energy-density friction transmission system is a key of high-performance transmission and has prominent features of high power and high rotating speed. Wet friction elements are widely used in the technical field of heavy-duty vehicle transmission due to their excellent wear resistance and relatively high thermal capacity. The problem of thermoelastic instability of wet friction elements frequently occurs to result in overall performance deterioration and even failure of a vehicle transmission system.

When relative speeds of friction pairs are greater than a certain critical value, the non-uniformity of a temperature field may be exponentially increased with time, namely the system enters a thermoelastic instability (TEI) state. Local high temperature (hot spots) caused by TEI is one of important reasons of element failure. The problem of TEI will make the friction pairs generate local high temperature, and furthermore, and can cause phenomena such as high-frequency vibration, warpage deformation and even fatigue fracture in a friction transmission process.

After nearly half a century of research, greater achievements have been made on the problem of TEI in terms of theories, simulation and experiments. Based on theoretical models of Barber and Burton et al, thermoelastic theoretical research usesa finite element method as an effective tool for researching the problem of TEI, while experimental research verifies the results of theoretical research and simulations.

However, the research of most of scholars at home and abroad on impact of materials and structural parameters of the friction pairs on thermoelastic stability at present mainly focuses on parameters such as physical and chemical properties and other properties of a friction material as well as thicknesses and radii of the friction pairs, but impact of a distribution state of grooves in a friction layer and structural features on the dynamic characteristics of TEI is not taken into consideration.

Therefore, there is a need for a method for improving the thermoelastic stability of a wet friction element by improving characteristics of straight grooves of the wet friction element at present.

SUMMARY

In view of the above, the present disclosure provides a method for optimizing feature parameters of straight grooves of a wet friction element. By using the method, the feature parameters of the straight grooves of the wet friction element can be improved by optimization, and the thermoelastic stability of the wet friction element can be improved.

In one aspect, the present disclosure provides a method for optimizing feature parameters of straight grooves of a wet friction element, the wet friction element includes a plurality of friction disks and mating steel disks which are alternately distributed, wherein the adjacent friction disks and mating steel disks form friction pairs, each friction disk is provided with a set number of straight grooves which divide a friction surface of the friction disk into a set number of blocks, wherein the method for optimizing the feature parameters of the straight grooves includes the following steps:

structural feature parameters of the straight grooves requiring optimization are determined, wherein the structural feature parameters requiring optimization include the number N of the straight grooves, angles $\theta$ of the straight grooves, widths B of the straight grooves and depths h of the straight grooves.

The number N of the straight grooves is the total number of grooves in all the groove groups distributed on the surface of a single friction disk, where each groove group is composed of three adjacent and parallel grooves (a middle groove between two side grooves).

The angles $\theta$ of the straight grooves refer to included angle formed between the middle grooves of the groove groups and a diameter of the friction disk passing through midpoints of lengths of the middle grooves.

The depths h of the straight grooves refer to vertical distances from bottoms of the straight grooves to surfaces of the friction disks.

The widths B of the straight grooves refer to width distances of regions, cut by the straight grooves, on the surfaces of the friction disks.

An optimization order of the structural feature parameters is set as N→$\theta$→B→h.

Evaluation indexes are set to include an average temperature u of a temperature field, a non-uniformity coefficient $\sigma$ of the temperature field and a temperature range R; and the order of evaluation is set as $\mu$→R→$\sigma$.

A current optimized parameter is selected sequentially according to the set optimization order of the structural feature parameters, for which the following optimization process is executed to obtain an optimal value of the current optimized parameter until optimal values corresponding to all the structural feature parameters are obtained, and the structures of the straight grooves of the wet friction element are determined according to the optimal values of all the structural feature parameters.

The optimization process includes: setting M values for the current optimized parameter and setting other structural feature parameters as fixed values to form M groups of structural feature parameter data, performing thermoelastic simulation on the wet friction element for M times to obtain M groups of simulation results, wherein the simulation results include temperatures, thermal stresses and strain forces of the friction pairs; and calculating numerical values of the evaluation indexes according to the simulation results, evaluating the M values of the current optimized parameter according to the set evaluation index order, and selecting the optimal value.

Further, the step of setting M values for the current optimized parameter can include: if the current optimized parameter is the number N of the straight grooves, setting 5 values which are respectively 4, 6, 8, 10 and 12; if the current optimized parameter is the angles $\theta$ of the straight grooves, setting values to be distributed within an interval [0°, 45°] and adjacent set values are spaced by 5°; if the current optimized parameter is the widths B of the straight grooves, setting values to be distributed within an interval [1 mm, 5 mm] and adjacent set values are spaced by 0.8 mm; and if the current optimized parameter is the depths h of the straight grooves, setting values to be distributed within an interval [0.2 mm, 0.6 mm] and adjacent set values are spaced by 0.1 mm.

In one embodiment, the optimal values of the structural feature parameters are as follows: the optimal value of the number N of the straight grooves is 8, the optimal values of the angles θ of the straight grooves are 5°, the optimal values of the depths h of the straight grooves are 0.4 mm, and the optimal values of the widths B of the straight grooves are 0.24 mm.

Beneficial Effects:

(1) The present disclosure provides a method for optimizing feature parameters of straight grooves of a wet friction element, the structural feature parameters of the straight grooves requiring optimization are determined by analyzing a thermoelastic stability theory of the wet friction element and include the number N of the straight grooves, angles θ of the straight grooves, widths B of the straight grooves and depths h of the straight grooves; and the optimization order of all the structural feature parameters are determined. Also, the evaluation order of evaluation index is determined by calculating the critical speed of thermoelastic instability, the optimal values of all the structural feature parameters are obtained by a thermoelastic simulation experiment, the structures of the straight grooves of the wet friction element are determined according to the optimal values, and thus, the wet friction element with higher thermoelastic stability is achieved, and the optimization for the structural feature parameters of the straight grooves of the wet friction element is realized.

DETAILED DESCRIPTION OF THE EMBODIMENTS

The present disclosure is described in detail below in conjunction with accompanying drawings and embodiments.

The present disclosure provides a method for optimizing feature parameters of straight grooves of a wet friction element, the wet friction element includes a plurality of friction disks and mating steel disks which are alternately distributed, wherein the adjacent friction disks and mating steel disks form friction pairs, each friction disk is provided with a set number of straight grooves which divide a friction surface of the friction disk into a set number of blocks.

Figure 2:
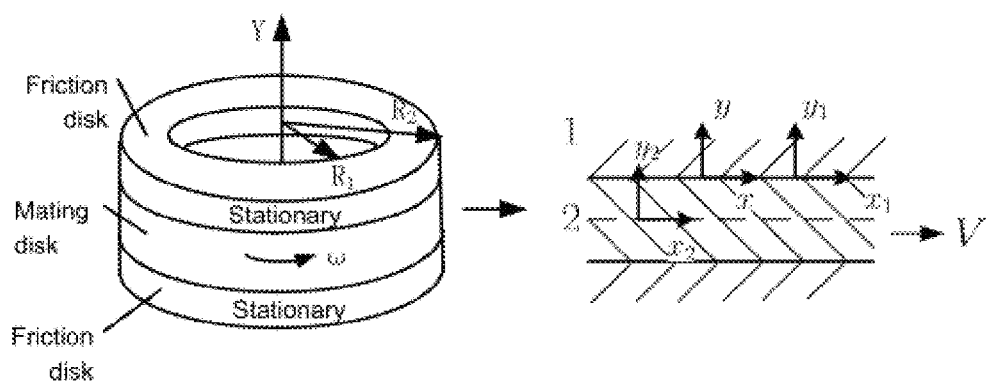
FIG. 2 is a schematic diagram of a two-dimensional thermoelastic instability analysis model in an embodiment of the present disclosure.

Since there is a significant difference in thermal conductivity of the mating steel disks and a friction material, most of friction heat is conducted to enter the mating steel disks, and only the surface layer of the friction material is affected by a hot spot, and therefore, the friction disks may be simplified as a stationary semi-infinite plane; and the mating steel disks are simplified as a moving finite-thickness plane. A two-dimensional theoretical model is used, and it is assumed that the friction disks (material 1) are stationary and the steel disks (material 2) move at a speed V to represent relative speeds of the friction pairs, as shown in FIG. 2.

Figure 1:
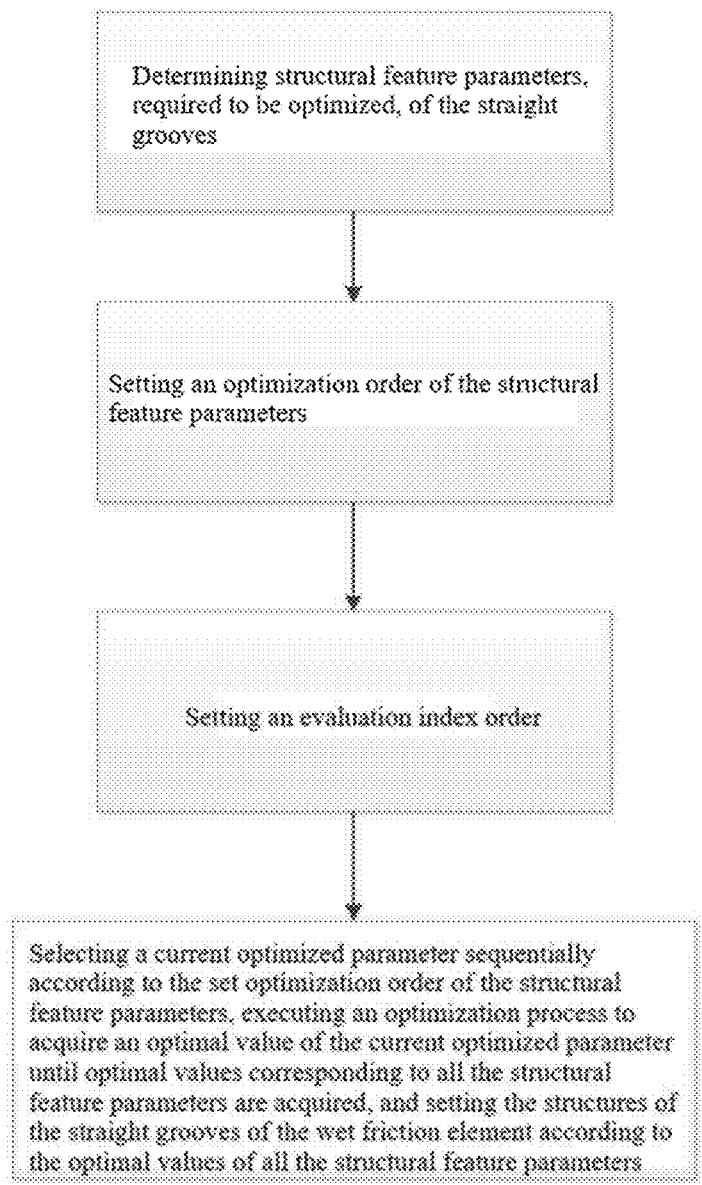
FIG. 1 is a flow diagram of a method for optimizing feature parameters of straight grooves of a wet friction element, according to an embodiment of the present disclosure.

A process of the method for optimizing the feature parameters of the straight grooves is shown in FIG. 1 and includes the following steps:

S1, determining structural feature parameters of the straight grooves that require optimization, wherein the structural feature parameters of the straight grooves requiring optimization include the number N of the straight grooves, angles θ of the straight grooves, widths B of the straight grooves and depths h of the straight grooves.

The number N of the straight grooves is the total number of groove groups distributed on the surface of a single friction disk, and each groove group is composed of three adjacent and parallel grooves; the angles θ of the straight grooves refer to included angles formed between the middle grooves in the groove groups and a diameter of the friction disks passing through midpoints of lengths of the middle grooves; the depths h of the straight grooves refer to vertical distances from bottoms of the straight grooves to the surfaces of the friction disks; and the widths B of the straight grooves refer to width distances of regions, cut by the straight grooves on the surfaces of the friction disks.

Figure 3:
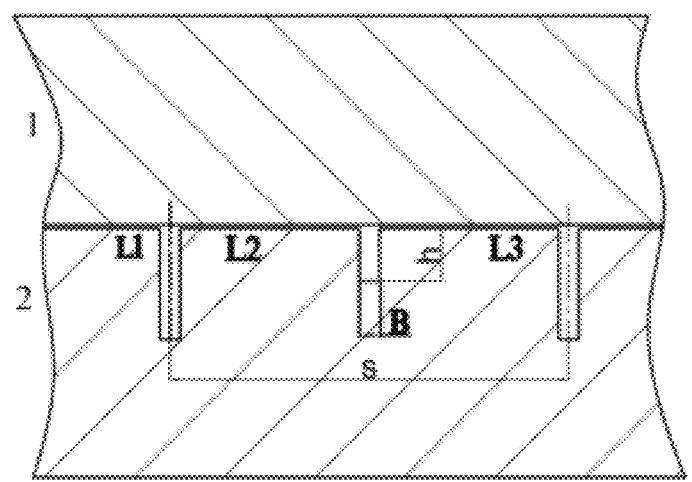
FIG. 3 is a schematic diagram of an equivalent friction radius of a groove in an embodiment of the present disclosure.

The blocks divided by the grooves, as shown in FIG. 3, are generally divided into three types, in groove distribution feature parameters, the number, angles and widths of the grooves change the equivalent friction arc length of each region, while the depths of the grooves also affect the equivalent thickness of each block, namely the groove distribution feature parameters will affect system stability of the number of disturbance waves, frequency and the like. Equivalent arc length formulae of the three blocks can be obtained by virtue of theoretical analysis, according to self-balance, disturbance wavelengths cannot be greater than the equivalent arc length of each block, and the allowable maximum wavelength should be equal to an equivalent friction radius arc length L cut by each block, so that at least one disturbance wavelength should exist on each block, and an integer number of wavelengths can only exist. By combining with a theoretical analysis result of thermoelastic instability, it is determined that the structural feature parameters of the straight grooves that require optimization include the number, angles, widths, depths and the like of the straight grooves.

S2, setting an optimization order of the structural feature parameters as N→θ→B→h.

Evaluation indexes are set to include an average temperature μ of a temperature field, a non-uniformity coefficient σ of the temperature field and a temperature range R; and an evaluation index order is set as μ→R→σ.

The basis of setting the optimization order of the structural feature parameters is explained as follows:

a critical speed $V_{cr}$ of thermoelastic instability is calculated:

$$V_{cr} = \frac{Km(1-v)}{\alpha(1+v)\mu f}$$

wherein m is the wave number of disturbance waves in an instable state and is an intermediate value for solving the critical speed;

$$m = 2\pi/L;$$

wherein L is an arc length of an equivalent friction circle cut by each group of grooves, $L=L_1+L_2+L_3$; $L_1=2\pi R_f/N-2\pi \arctan((s+B)/R_f)$; $L_2=\pi\{\arctan[(s+B)/R_f]+\theta\}$; $L_3=\pi\{\arctan[(s+B)/R_f]-\theta\}$;

$$x_1 = \frac{1/L_1}{1/L}, x_2 = \frac{1/L_2}{1/L}, x_3 = \frac{1/L_3}{1/L},$$

a circle corresponding to a set radius on one of the friction disks is selected as the equivalent friction circle: a whole model is divided into a plurality of blocks by the grooves, the blocks divided by each groups of grooves are respectively counted as a block 1, a block 2 and a block 3 clockwise, L is the arc length of the equivalent friction circle cut by each group of grooves, $R_f$ is a radius of the equivalent friction circle, and $L_1$, $L_2$ and $L_3$ are respectively arc lengths of equivalent friction circles of the block 1, the block 2 and the block 3. $x_1$, $x_2$ and $x_3$ are respectively contribution proportions of the block 1, the block 2 and the block 3 to the wave number;

structural parameters: N is the number of the groove groups in a single-surface friction disk, and s is a distance between two outermost grooves in each group of grooves;

material parameters: f is a friction coefficient, K is a thermal conductivity coefficient, v is a Poisson ratio, and α is a shear modulus; and significance of solving $V_{cr}$: the greater the value of the solved critical speed is, the more stable the thermoelastic property is, the contribution of the optimized feature parameters of the grooves to the thermoelastic property can be determined according to a formula, parameters with greater contributions are optimized with priority, and thus, the optimization order of the structural feature parameters can be obtained.

S3, selecting a current optimized parameter sequentially according to the set optimization order of the structural feature parameters, executing the following optimization process to obtain an optimal value of the current optimized parameter until optimal values corresponding to all the structural feature parameters are obtained, and setting the structures of the straight grooves of the wet friction element according to the optimal values of all the structural feature parameters; wherein the optimization process includes: setting M values for the current optimized parameter and setting other structural feature parameters as fixed values to form M groups of structural feature parameter data, performing thermoelastic simulation on the wet friction element for M times to obtain M groups of simulation results, wherein the simulation results include temperatures, thermal stresses and strain forces of the friction pairs; and calculating numerical values of the evaluation indexes according to the simulation results, evaluating the M values of the current optimized parameter according to the set evaluation index order, and selecting the optimal value.

If the current optimized parameter is the number N of the straight grooves, there are limitations according to geometric dimensions and the groove spacing, and a symmetric even number with a value being 4, 6, 8, 10 and 12 should be selected. If the value exceeds 12, the adjacent groove groups may interfere, and if the value is smaller than 4, the dynamic balance is instable.

If the current optimized parameter is the angles θ of the straight grooves, values are set to be distributed within an interval [0°, 45°] and adjacent set values are spaced by 5°.

If the current optimized parameter is the widths B of the straight grooves, values are set to be distributed within an interval [1 mm, 5 mm] and adjacent set values are spaced by 0.8 mm.

If the current optimized parameter is the depths h of the straight grooves, values are set to be distributed within an interval [0.2 mm, 0.6 mm] and adjacent set values are spaced by 0.1 mm.

When the M values of the current optimized parameter are evaluated according to the set evaluation index order, the order $\mu \rightarrow R \rightarrow \sigma$ may be adopted, a value capable of making the average temperature μ of the temperature field achieve the best effect is selected in consideration of the relatively high priority order of the average temperature μ of the temperature field, and meanwhile, the value also makes the temperature range R and the non-uniformity coefficient σ of the temperature field achieve a better effect. If the optimal value cannot be selected according to the average temperature μ of the temperature field, the optimal value is determined according to a second or third evaluation index.

Analyzed according to a thermoelastic coupling mechanism, the friction disks are assumed to be stationary, the mating disks are in frictional contact at a certain relative rotating speed, and in this process, the friction disks and the mating disks are kept to be coaxial. Therefore, for the simulation model set in the present disclosure, boundary conditions for the friction disks are that radial displacement constraints are applied to outer cylindrical surfaces, and y-direction rotational displacement constraints are applied to sections; and boundary conditions for the mating disks are that y-direction displacement constraints are set on half-thickness sections, radial displacement constraints are applied to inner cylindrical surfaces of the mating disks, and y-direction rotating speed constraints are applied.

Figure 4:
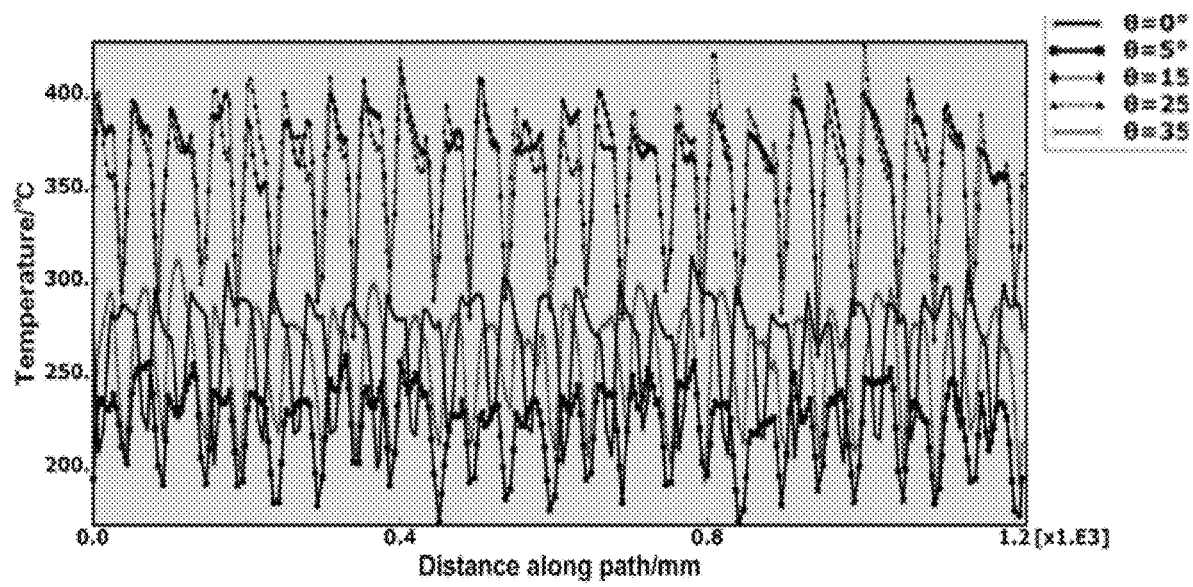
FIG. 4 is a sampling temperature diagram on different groove angles in an embodiment of the present disclosure.
Figure 5:
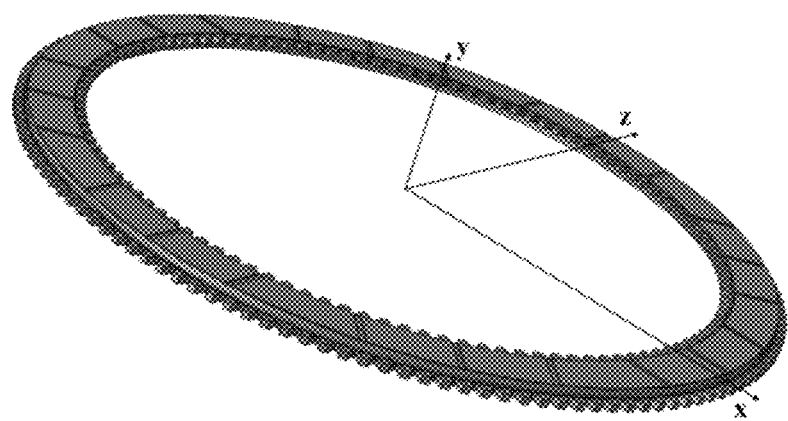
FIG. 5 is an experiment diagram of friction disks and mating disks in an embodiment of the present disclosure.
Figure 6:
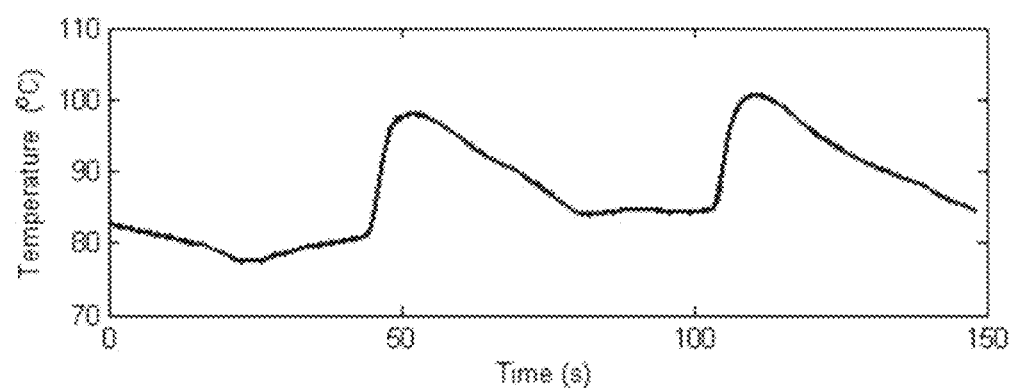
FIG. 6 is a data curve of test results of an experiment in an embodiment of the present disclosure.

A circumferential path of a simulation result, passing through a hot spot region, of the wet friction element is selected, node data of the circumferential path are acquired to obtain temperature, stress and strain sampling data of the wet friction element, and the sample values are processed to obtain a sampling data curve; and with a parameter, namely the number of the grooves, as an example, FIG. 4 is a sampling data image at different groove angles, and in the image, certain simulation result data with different structural parameters are constructed into a curve chart.

The acquired data and data curve are evaluated and analyzed, wherein evaluation parameters include an average temperature μ of a temperature field, a non-uniformity coefficient σ and a temperature range R, and the specific evaluation indexes are defined as shown in table 1; the sampling data acquired in step 3 are brought into an evaluation parameter calculation formula based on a probability statistics theory to acquire an evaluation parameter result, as shown in table 2; and then, the obtained evaluation parameter result is comprehensively analyzed, and then, the optimal results of the different structural feature parameters are determined to obtain an optimal groove structure of the overall wet friction element, wherein N=8, θ=5°, h=0.4 mm and B=0.24 mm.

TABLE 1

Evaluation Indexes of Thermoelastic Stability of Temperature Field

| Evaluation indexes | Equations | Meanings of index |
|---|---|---|
| Average temperature μ of temperature field | $\mu = \sum_{j=1}^{n} t_i / n$ | Arithmetic mean of each temperature |
| Non-uniformity coefficient σ of temperature field | $\sigma = \sqrt{\sum_{i=1}^{n}(t_i - \mu)^2 /(n-1)} \Big/ \mu$ | A degree of non-uniformity of the temperature field |
| Temperature range R | $R = T_{max} - T_{min}$ | Maximum temperature difference of the temperature |

TABLE 2

Calculation Result of Evaluation Indexes of Thermoelastic Stability of Temperature Field

| Variable parameters | Average temperature μ of temperature field | Temperature range R | Non-uniformity coefficient σ of temperature field |
|---|---|---|---|
| N = 4 | 283.2830695 | 123.4693451 | 0.077531769 |
| N = 6 | 355.4887773 | 141.8031921 | 0.068811926 |
| N = 8 | 267.3810665 | 114.550766 | 0.095576061 |
| N = 10 | 365.3134433 | 140.176239 | 0.079104937 |
| N = 12 | 359.3530698 | 123.4693451 | 0.109604323 |
| θ = 0° | 267.3810665 | 114.550766 | 0.095576061 |
| θ = 5° | 223.7877438 | 89.95323181 | 0.087757486 |
| θ = 15° | 359.8950148 | 153.4871216 | 0.088816806 |
| θ = 25° | 361.2944677 | 166.0620422 | 0.084181642 |
| θ = 35° | 259.4704003 | 114.550766 | 0.098876876 |
| B = 0.16 mm | 373.1020197 | 154.1856995 | 0.088253895 |
| B = 0.24 mm | 202.5717494 | 77.03237915 | 0.07761322 |
| B = 0.32 mm | 267.3810665 | 114.550766 | 0.095576061 |
| B = 0.40 mm | 234.2348445 | 109.7890167 | 0.101724642 |
| B = 0.48 mm | 266.0951945 | 154.1856995 | 0.112875321 |
| h = 0.20 mm | 340.4474526 | 157.0566559 | 0.100085531 |
| h = 0.30 mm | 324.4783671 | 184.4455414 | 0.127191147 |
| h = 0.40 mm | 246.2183477 | 105.7106934 | 0.082673089 |
| h = 0.50 mm | 267.3810665 | 114.550766 | 0.095576061 |
| h = 0.60 mm | 261.0173058 | 157.0566559 | 0.098263861 |

The optimized groove structure is achieved, wherein N=8, θ=5°, h=0.4 mm and B=0.24 mm.

The above-mentioned preferred embodiments of the present disclosure are not intended to limit the protective scope of the present disclosure. Any modifications, equivalent replacements, improvements and the like made within the sprit and principle of the present disclosure should fall within the protective scope of the present disclosure.

The invention claimed is:

1. A method for optimizing feature parameters of straight grooves of a wet friction element, the wet friction element comprising a plurality of friction disks and mating steel disks alternately distributed, the adjacent friction disks and mating steel disks forming friction pairs, and each friction disk being provided with a set number of straight grooves which divide a friction surface of the friction disk into a set number of blocks, wherein the method for optimizing the feature parameters of the straight grooves comprises the following steps:

determining structural feature parameters of the straight grooves that require optimization, which comprise the number N of the straight grooves, angles θ of the straight grooves, widths B of the straight grooves and depths h of the straight grooves;

wherein the number N of the straight grooves is the total number of groove groups distributed on the surface of a single friction disk, and each groove group is composed of three adjacent and parallel grooves;

wherein the angles θ of the straight grooves refer to included angles formed between the middle grooves of the groove groups and a diameter of the friction disks passing through midpoints of lengths of the middle grooves;

wherein the depths h of the straight grooves refer to vertical distances from bottoms of the straight grooves to surfaces of the friction disks; and wherein the widths B of the straight grooves refer to width distances of regions, cut by the straight grooves, on the surfaces of the friction disks;

setting an optimization order of the structural feature parameters as N→θ→B→h;

setting evaluation indexes to comprise an average temperature μ of a temperature field, a non-uniformity coefficient σ of the temperature field and a temperature range R; and setting an evaluation index order as μ→R→σ; and selecting a current optimized parameter sequentially according to the set optimization order of the structural feature parameters, executing the following optimization process to obtain an optimal value of the current optimized parameter until optimal values corresponding to all the structural feature parameters are obtained, and setting the structures of the straight grooves of the wet friction element according to the optimal values of all the structural feature parameters; wherein the optimization process comprises:

setting M values for the current optimized parameter and setting other structural feature parameters as fixed values to form M groups of structural feature parameter data, performing thermoelastic simulation on the wet friction element for M times to obtain M groups of simulation results, wherein the simulation results comprise temperatures, thermal stresses and strain forces of the friction pairs; and calculating numerical values of the evaluation indexes according to the simulation results, evaluating the M values of the current optimized parameter according to the set evaluation index order, and selecting the optimal value.

2. The method according to claim 1, wherein the step of setting M values for the current optimized parameter specifically comprises:

setting 5 values which are respectively 4, 6, 8, 10 and 12 under the condition that the current optimized parameter is the number N of the straight grooves;

setting values to be distributed within an interval [0°, 45°] and adjacent set values are spaced by 5° under the condition that the current optimized parameter is the angles θ of the straight grooves;

setting values to be distributed within an interval [1 mm, 5 mm] and adjacent set values are spaced by 0.8 mm under the condition that the current optimized parameter is the widths B of the straight grooves; and setting values to be distributed within an interval [0.2 mm, 0.6 mm] and adjacent set values are spaced by 0.1 mm under the condition that the current optimized parameter is the depths h of the straight grooves.

3. The method according to claim 2, wherein the optimal values of the structural feature parameters are determined as follows:

the optimal value of the number N of the straight grooves is 8, the optimal values of the angles θ of the straight grooves are 5°, the optimal values of the depths h of the straight grooves are 0.4 mm, and the optimal values of the widths B of the straight grooves are 0.24 mm.

4. The method according to claim 1, wherein the optimal values of the structural feature parameters are determined as follows:

the optimal value of the number N of the straight grooves is 8, the optimal values of the angles θ of the straight grooves are 5°, the optimal values of the depths h of the straight grooves are 0.4 mm, and the optimal values of the widths B of the straight grooves are 0.24 mm.

* * * * *